(12) United States Patent
Chan et al.

(10) Patent No.: US 7,158,342 B2
(45) Date of Patent: *Jan. 2, 2007

(54) HARD DISK DRIVE WITH AERODYNAMIC DIFFUSER, CONTRACTION, AND FAIRING FOR DISK BASE AND RE-ACCELERATION DRAG REDUCTION

(75) Inventors: Andre Sirilutporn Chan, Milpitas, CA (US); Ferdinand Hendriks, Morgan Hill, CA (US)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 566 days.

This patent is subject to a terminal disclaimer.

(21) Appl. No.: 10/644,172

(22) Filed: Aug. 20, 2003

(65) Prior Publication Data

US 2005/0041329 A1 Feb. 24, 2005

(51) Int. Cl.
*G11B 33/14* (2006.01)
(52) U.S. Cl. .................................. 360/97.02
(58) Field of Classification Search ............. 360/97.01, 360/97.02, 97.03
See application file for complete search history.

(56) References Cited

U.S. PATENT DOCUMENTS

| | | | |
|---|---|---|---|
| 3,720,931 | A | 3/1973 | Andersen |
| 4,369,475 | A | 1/1983 | Ho et al. |
| 4,587,645 | A | 5/1986 | Wong et al. |
| 5,031,059 | A | 7/1991 | Yamaguchi et al. |
| 5,134,530 | A | 7/1992 | Hall |
| 5,140,578 | A | 8/1992 | Tohkairin |
| 5,907,453 | A | 5/1999 | Wood et al. |
| 6,091,570 | A | 7/2000 | Hendriks |
| 6,208,484 | B1 | 3/2001 | Voights |
| 6,362,937 | B1 | 3/2002 | Gibbs et al. |
| 6,417,986 | B1 | 7/2002 | Tran et al. |
| 6,487,038 | B1 | 11/2002 | Izumi et al. |
| 6,600,626 | B1 | 7/2003 | Shimizu et al. |
| 6,788,493 | B1 * | 9/2004 | Subramaniam et al. .. 360/97.02 |
| 6,898,048 | B1 * | 5/2005 | Adams et al. ........... 360/97.02 |
| 2002/0075591 | A1 | 6/2002 | Chang et al. |
| 2002/0149876 | A1 | 10/2002 | Sakata et al. |

FOREIGN PATENT DOCUMENTS

| | | |
|---|---|---|
| JP | 61151892 | 7/1986 |
| JP | 61198485 | 9/1986 |
| JP | 62022290 | 1/1987 |
| JP | 62076089 | 4/1987 |
| JP | 62085997 | 6/1987 |
| JP | 6355299 | 4/1988 |
| JP | 1133392 | 9/1989 |

(Continued)

*Primary Examiner*—William J Klimowicz
(74) *Attorney, Agent, or Firm*—Bracewell & Giuliani LLP (57) ABSTRACT

A device streamlines air flow inside a hard disk drive with a stationary afterbody that is located adjacent to each of the disks. The device gradually expands the air flow so that the speed of the air flow gradually decreases while pressure increases. This design reduces losses in system momentum due to sudden expansion of the air in the drive. In addition, air flow moving toward the disk pack may be contracted to allow efficient energy conversion from pressure energy to kinetic energy prior to merging of the bypass air flow with the air flow among the disks. The device has a comb-like structure that is offset from the disk pack in the radial direction. The structure fulfills an aerodynamic function, reduces track misregistration, lowers overall aerodynamic dissipation, and fulfills a filtration function.

24 Claims, 5 Drawing Sheets

FOREIGN PATENT DOCUMENTS

| | | |
|---|---|---|
| JP | 1144286 | 9/1989 |
| JP | 1170399 | 12/1989 |
| JP | 3054791 | 3/1991 |
| JP | 5347089 | 12/1993 |
| JP | 2002109858 A * | 4/2002 |
| JP | 2002124062 | 4/2002 |
| JP | 2002133827 A * | 5/2002 |
| JP | 2003257155 | 9/2003 |

* cited by examiner

HARD DISK DRIVE WITH AERODYNAMIC DIFFUSER, CONTRACTION, AND FAIRING FOR DISK BASE AND RE-ACCELERATION DRAG REDUCTION

BACKGROUND OF THE INVENTION

1. Technical Field

The present invention relates in general to an improved internal aerodynamic design for a hard disk drive and, in particular, to an improved system, method, and apparatus for diffusing and contracting air flow within a hard disk drive to reduce flow-induced vibrations of the arm, suspension and slider as well as the rotating disks.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The surface of the slider facing the disk is aerodynamically shaped to create an air bearing in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a substantially constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops a torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

In the prior art, a number of solutions have been proposed to enhance the air flow within hard disk drives, such as bypass channels located adjacent to the disk pack. For example, Japanese Patent JP53-47089, to Yasuaki, reveals a hard disk device in which air guides 20, 30 only guide a central portion of the flow of air back to the disks. Japanese Patent JP62-85997, to Wakatsuki, discloses a magnetic disk device (FIGS. 3–5) in which a housing 31 with doors 20 guides the flow of air from the disks to a filter. U.S. Pat. No. 5,907,453, to Wood, reveals diverter ramps 220, 222 (FIG. 9) that also only affect a central portion of the air flow.

Currently known implementations of bypass channels such as these force a sudden widening of the air flow cross-section by as much as 50%. The sum of the thicknesses of the disk(s) in the disk pack is a significant fraction of the height of the bypass channel in the direction of the spindle axis. As a result, present designs cause objectionable disk base drag due to the disk wakes in the bypass channel. Moreover, there is also objectionable drag due to re-acceleration of the slow, bypass air flow around the actuator. Thus, an improved solution for streamlining air flow within a hard disk drive would be desirable.

SUMMARY OF THE INVENTION

One embodiment of a system, method, and apparatus for streamlining air flow inside of a hard disk drive is disclosed. The air flow is guided into a bypass channel. Each disk is provided with a stationary afterbody. The afterbody is shaped such that an expanding duct is created for the flow coming off each disk. An expanding aerodynamic duct is called a diffuser. In one embodiment, a diffuser provides a gradually expanding passage so that the speed of the air flow can gradually, rather than abruptly, decrease and the pressure can rise. This design reduces losses in system momentum due to sudden expansion of the air or gas in the drive.

The present invention also ensures a smooth recovery process of pressure from kinetic energy in the entering flow field, which reduces the amount of power required by the spindle motor. The downstream diffuser receives air flow spun off the disks while reducing the rate of cross sectional expansion, and consequential turbulence, of the air as it travels from among the disk surfaces around the actuator and non-aerodynamic disk drive components. Upon return of the bypass flow to the disk pack, air flow reentering the disk pack is accelerated in a channel of diminishing cross section to allow efficient energy conversion from pressure energy to kinetic energy prior to merging of the bypass air flow with the air flow among the disks.

The present invention utilizes a comb-like structure (diffuser or contraction) that is offset slightly from the spinning disk pack in the radial direction by approximately 0.5 mm, or whatever minimal distance is required due to mechanical tolerances. In one embodiment, the structure fulfills an aerodynamic function only. However, the structure may also be configured to perform a filtration function, in which case the structure may be formed from a filtration substance. The efficacy of the filtration material may be enhanced, for example, by incorporation of electric charges (electret). The structure may be provided with linear or rounded tapers. However, smooth, edge-free tapers are desirable. For example, since the contraction is required to re-accelerate the air flow into the disk pack, the leading edges of the contraction are preferably rounded.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
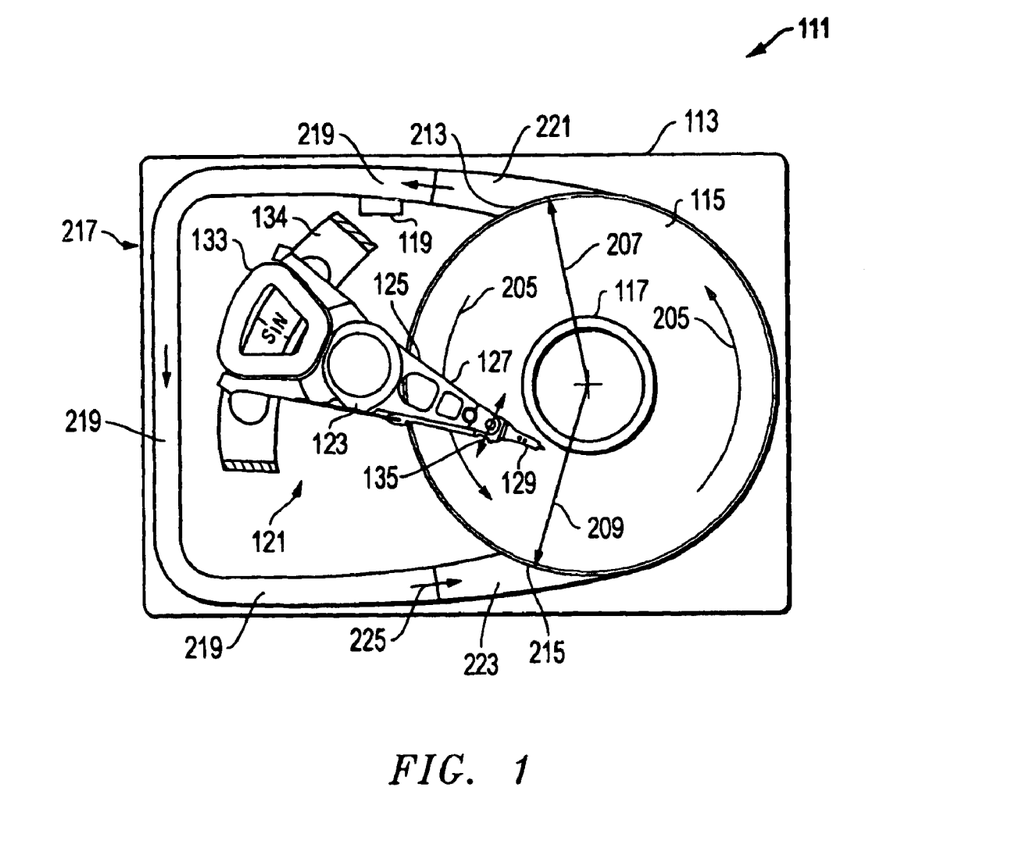
FIG. 1 is a schematic, top plan view of a hard disk drive constructed in accordance with the present invention.

Referring to FIG. 1, a schematic drawing of one embodiment of an information storage system comprising a magnetic hard disk file or drive 111 for a computer system is shown. Drive 111 has an outer housing or base 113 containing a disk pack having at least one media or magnetic disk 115. The disk or disks 115 are rotated (see arrows 205) by a spindle motor assembly having a central drive hub 117. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be of "femto" size (approximately 850×700×230 microns) and is pre-loaded against the surface of disk 115 (in the range two to ten grams) by suspension 127.

Suspensions 127 have a spring-like quality, which biases or urges the air bearing surface of the slider 129 against the disk 115 to cause the slider 129 to fly at a precise distance from the disk. A voice coil 133 free to move within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies along radial arcs across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Figure 4:
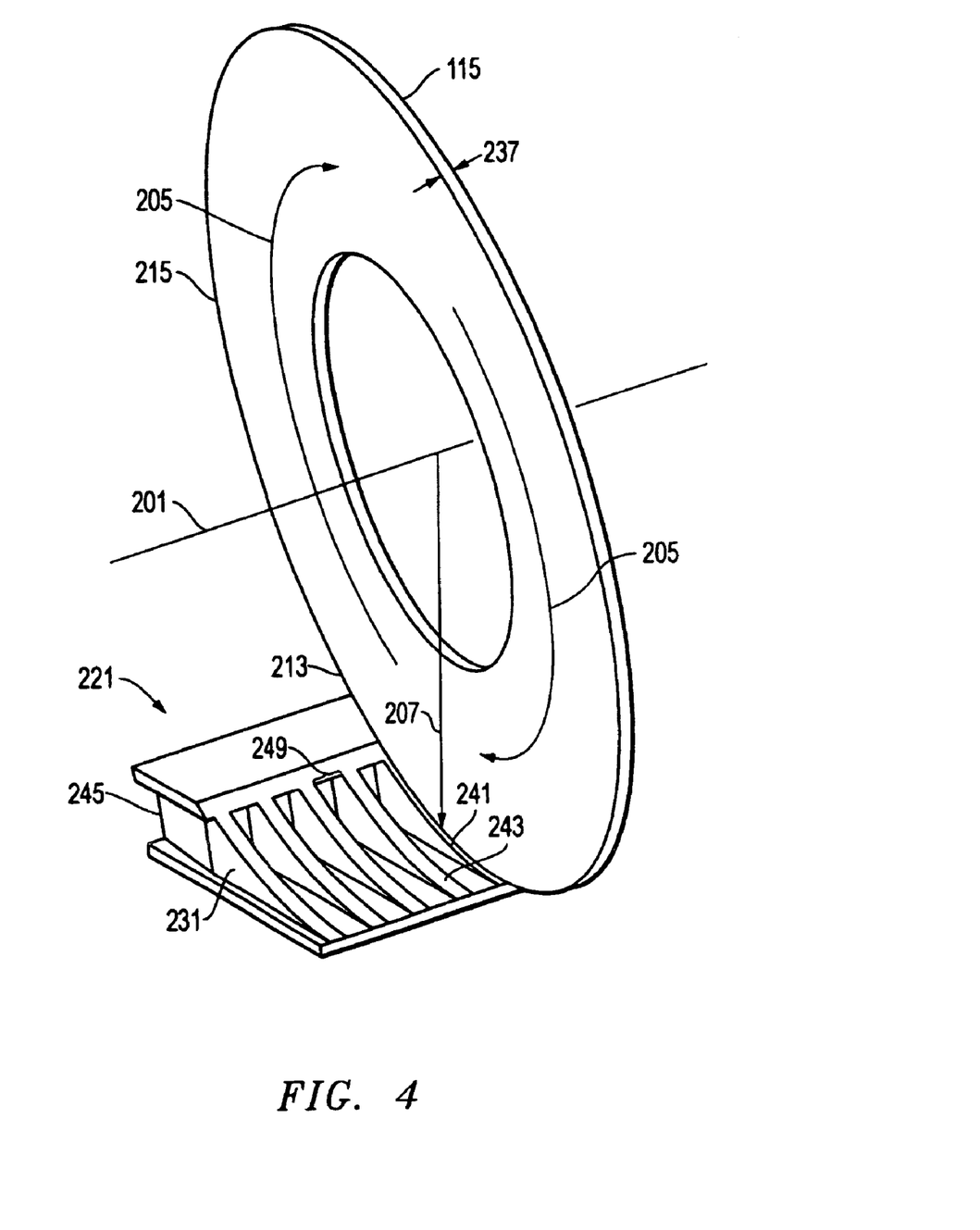
FIG. 4 is a front isometric view of the diffuser of FIG. 2 showing one of the adjacent disks, and is constructed in accordance with the present invention.

Referring now to FIGS. 1 and 4, the disk pack and disks 115 (one shown) define an axis 201 of rotation 205 and radial directions 207, 209, relative to the axis 201. The disk pack and disks 115 have a downstream side 213 wherein air flows away from the disks 115, and an upstream side 215 wherein air flows toward the disks 115. The drive 111 also has a bypass channel 219 formed in the housing 113 for directing the air flow generated by rotation of the disks 115 from the downstream side 213 of the disk pack or disks 115 to the upstream side 215 of the disk pack or disks 115. In the embodiment shown, the bypass channel 219 is located between an outer perimeter 217 (FIG. 1) of the housing 113 and the actuator 121, such that the bypass channel 219 completely circumscribes the actuator 121. In some HDD designs where there is not sufficient space to implement a full bypass channel (shown) the bypass channel 219 may be interrupted (not shown). This is known as a partial bypass. When there is a partial bypass, the presence of a diffuser and contraction remains beneficial. Furthermore, in order to help the bypass flow negotiate substantial angular changes (channel bends), one or more turning vanes may be placed in those areas. The use of turning vanes is well known in wind tunnel design.

As shown in FIGS. 1 through 4, one embodiment of the drive 111 constructed in accordance with the present invention also comprises a diffuser 221. In the embodiment shown, the diffuser 221 is located in the bypass channel 219 and is positioned adjacent to the downstream side 213 of the disk pack or disks 115. The diffuser 221 is also offset downstream from the disks 115 in the radial direction 207, such that the diffuser 221 reduces air flow drag from the disks 115 due to disk wake in the bypass channel 219. This type of aerodynamic drag is commonly called base drag.

Figure 5:
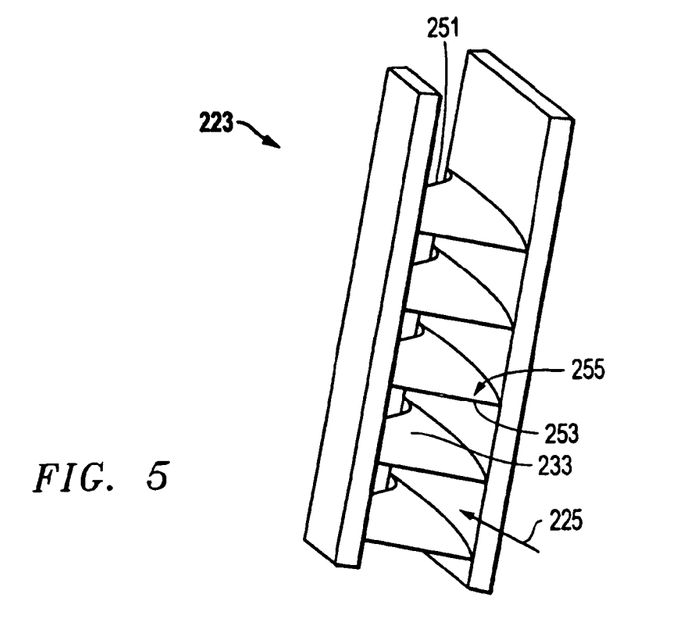
FIG. 5 is a front isometric view of a contraction for the hard disk drive of FIG. 1 and is constructed in accordance with the present invention.
Figure 6:
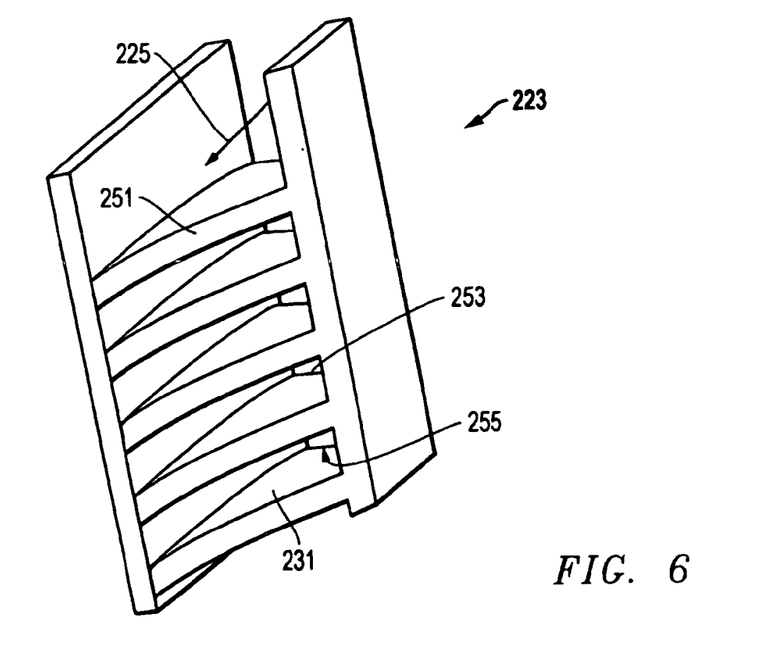
FIG. 6 is a rear isometric view of the contraction of FIG. 5, and is constructed in accordance with the present invention.

Alternatively, or operating in conjunction with the diffuser 221, another embodiment of the drive 111 may include a contraction device or contraction 223 (FIGS. 5 and 6). The contraction 223 is also located in the bypass channel 219, but is adjacent to the upstream side 215 of the disk pack or disks 115. Like the diffuser 221, the contraction 223 is offset upstream from the disks 115, but in a radial direction 209. Each of the diffuser 221 and the contraction 223 may be spaced apart from outer edges 213, 215, respectively, of the disks 115 in radial directions 207, 209, respectively, by, for example, no more than approximately 0.5 mm. The contraction 223 is provided for re-accelerating a slow bypass air flow 225 (FIGS. 1, 5, and 6) from the contraction 223 to the disks 115 to provide efficient energy conversion for the air flow from pressure energy to kinetic energy prior to merging the slow bypass air flow 225 with air flow 205 (FIG. 1) around the disks 115.

In another embodiment of the present invention, each of the diffuser 221 and/or the contraction 223 may further comprise an air filter(s) for filtering the air flowing through the bypass channel 219 and/or housing 113. Either or both structures 221, 223 may be configured to perform this filtration function, in which case they may be formed from a filtration substance. In one particular embodiment, the diffuser 221 and the contraction 223 incorporate electrical charges to filter the air flowing through the bypass channel 219 and/or housing 113. The efficacy of the filtration material may be enhanced, for example, by incorporation of electric charges (electret).

In the embodiments illustrated, both the diffuser 221 and the contraction 223 are equipped with a plurality of airfoils 231, 233, respectively. The airfoils 231, 233 may be identical but, as shown in the illustrations, they may be configured differently as well. The airfoils 231, 233 are axially apart from each other, respectively, in the axial direction. Each of the airfoils 231, 233 has a generally planar orientation in the radial direction. As shown, for example, in FIG. 4, the airfoils 231 (only one shown for clarity) are axially aligned with one of the disks 115. The airfoils 231, 233 also having a maximum axial thickness 235 (FIG. 2) that is preferably equal to an axial thickness 237 (FIG. 4) of a respective one of the disks 115. The diffuser shape must be such as to promote adherence of the flow to the surface while avoiding flow separation. It is well known in the art that flow separation occurs when the diffuser widens too suddenly. Furthermore, it will be understood that an array of flow conditioning measures can be applied to the basic diffuser shape shown for the purpose of promoting adherence of the flow to the diffuser walls. Among these measures are turbulators consisting of surface roughness elements, for example ridges, vortex generators, boundary layer tripping devices and the like. Other flow conditioning measure is irradiation of the flow with sound. The mentioned flow conditioning techniques are known in the art of aerodynamic design.

Each of the airfoils 231 of the diffuser 221 has a leading edge 241 with a generally cylindrical transverse surface 243 extending in the axial direction that flatly faces the disks 115. Transverse surface 243 is located immediately adjacent to a respective one of the disks 115 (see FIGS. 1 and 4) and is substantially perpendicular to a planar orientation of a respective one of the disks 115. Each of the airfoils 233 of the contraction 223 has a trailing edge 251 located immediately adjacent to a respective one of the disks 115, and a leading edge 253 with a rounded surface 255 that is located opposite the trailing edge 251.

The leading edges 241 of the airfoils 231 of the diffuser 221 and the trailing edges 251 of the airfoils 233 of the contraction 223 have arcuate contours that are complementary in shape with respect to circular outer edges 213, 215 of the disks 115. The airfoils 231 of the diffuser 221 also have trailing portions 245 located opposite the leading edges 241. The trailing portions 245 taper down in axial thickness in the air flow direction away from the disks 115 to define gradually expanding passages 249. The air flow transitions from the disks 115 to the trailing portions 245 along the tapers to gradually decrease a speed of the air flow.

Figure 2:
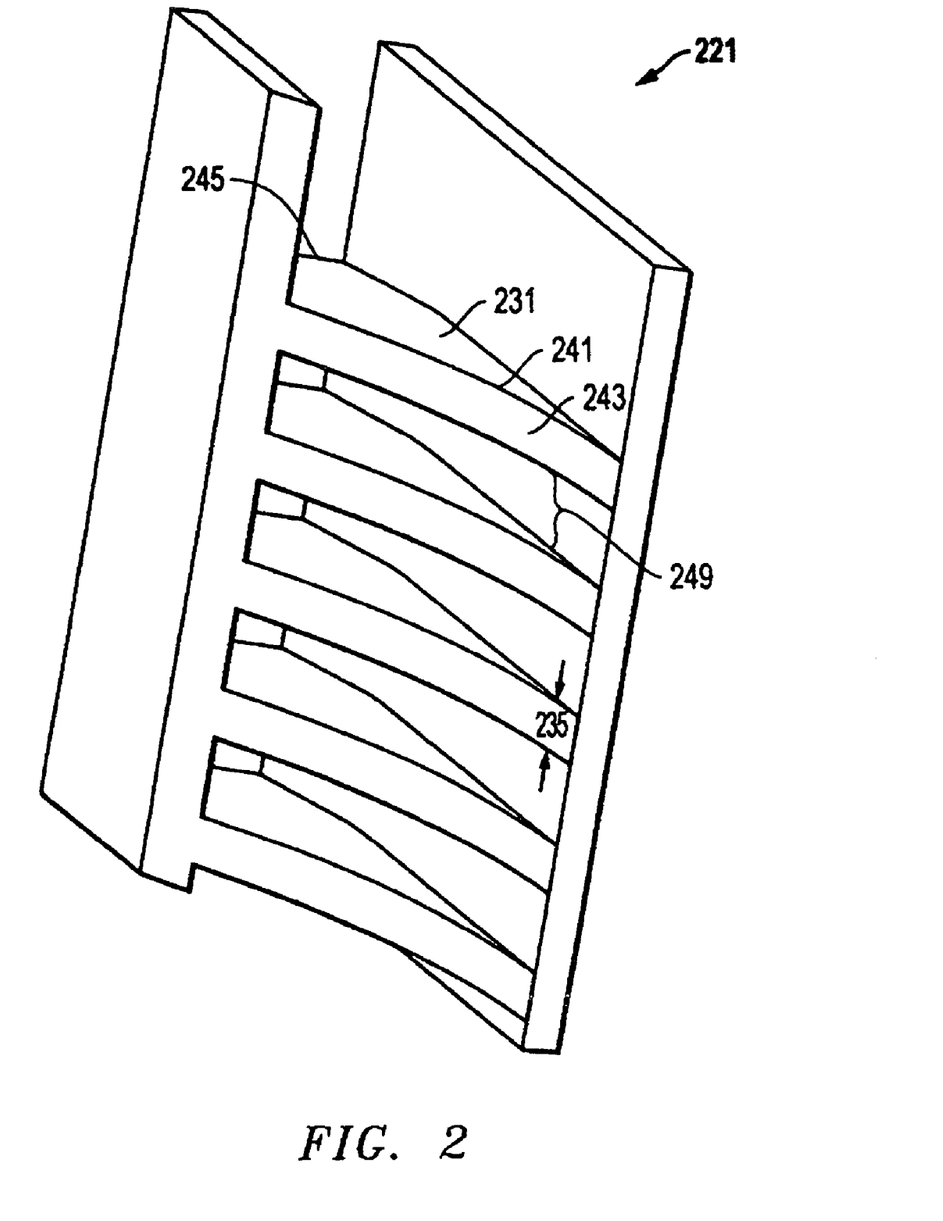
FIG. 2 is a front isometric view of a diffuser for the hard disk drive of FIG. 1 and is constructed in accordance with the present invention.
Figure 3:
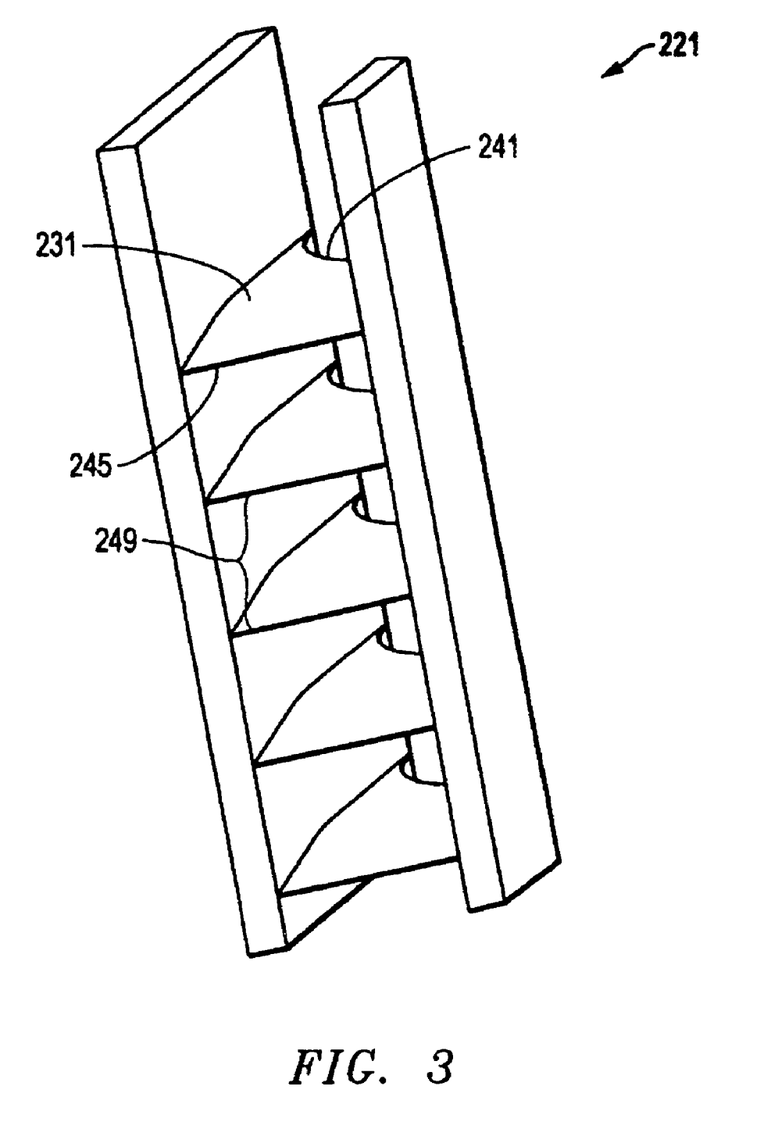
FIG. 3 is a rear isometric view of the diffuser of FIG. 2, and is constructed in accordance with the present invention.

As shown in FIGS. 2–4, the tapers on the airfoils 231 of the diffuser 221 are smooth and edge-free from the leading edges 241 to the trailing portions 245. Alternatively, the tapers may be configured with linear tapers. The airfoils 233 of the contraction 223 may be provided with similar smooth and edge-free tapers extending from their respective leading edges 253 to their respective trailing edges 251. In addition, the trailing portions 245 of the airfoils 231 of the diffuser 221 and the leading edges 253 of the airfoils 233 of the contraction 223 have linear edges that are substantially perpendicular to the directions of the air flow at the downstream and upstream sides 213, 215, respectively, of the disk pack or disks 115. Furthermore, the leading edges 253 of the airfoils 233 of the contraction 223 are preferably rounded 255, as shown in FIGS. 5 and 6.

The present invention has several advantages, including the ability to streamline air flow in a hard disk drive. The air flow is smoothed into the bypass channel with a stationary afterbody. The diffuser provides a gradual expanding passage so that the speed of the air flow can gradually decrease and the pressure can rise. This design reduces losses in system momentum due to sudden expansion of the air or gas in the drive, and ensures a smooth recovery of pressure from kinetic energy in the entering flow field. As a result, the amount of power required by the spindle motor is reduced. Alternatively, air flow moving toward the disk pack is contracted to allow efficient energy conversion from pressure energy to kinetic energy prior to merging of the bypass air flow with the air flow among the disks. The structure also may be used to filter the air flow. It will be understood that the present invention encompasses designs in which the diffuser or contraction are not implemented. The usual reason being interference with other drive components.

While the invention has been shown or described in only some of its forms, it should be apparent to those skilled in the art that it is not so limited, but is susceptible to various changes without departing from the scope of the invention.

What is claimed is:

1. A hard disk drive, comprising:
   a housing;
   a disk mounted to the housing and being rotatable relative to the housing, the disk defining an axis of rotation and a radial direction relative to the axis, and the disk having a downstream side wherein air flows away from the disk, and an upstream side wherein air flows toward the disk;
   an actuator mounted to the housing and being movable relative to the disk, the actuator having a head for reading data from and writing data to the disk;
   a bypass channel formed in the housing for directing air flow generated by rotation of the disk; and
   a diffuser located in the bypass channel adjacent to a downstream side of the disk and offset and completely spaced apart from the disk in the radial direction, such that the diffuser reduces drag from the disk due to disk wake in the bypass channel.

2. The hard disk drive of claim 1, wherein the diffuser further comprises an air filter for filtering the air flowing through the housing.

3. The hard disk drive of claim 2, wherein the air filter of the diffuser incorporates electrical charges to filter the air flowing through the housing.

4. The hard disk drive of claim 1, wherein the diffuser is spaced apart from the disk in the radial direction by approximately 0.5 mm.

5. The hard disk drive of claim 1, wherein the bypass channel is located between an outer perimeter of the housing and the actuator, such that the bypass channel completely circumscribes the actuator.

6. The hard disk drive of claim 1, wherein the diffuser is a comb-like structure having a pair of axially-oriented side walls and at least one air foil extending between the side walls.

7. The hard disk drive of claim 1, wherein the diffuser has an air foil having a generally planar orientation in the radial direction and being axially aligned with a planar orientation of the disk, the air foil also having a maximum axial thickness that is less than or equal to an axial thickness of the disk.

8. The hard disk drive of claim 7, wherein the air foil has a leading edge with a flat transverse surface extending in the axial direction that is located immediately adjacent to the disk and is substantially perpendicular to the planar orientation of the disk.

9. The hard disk drive of claim 8, wherein the leading edge of the air foil has an arcuate contour that is complementary in shape with respect to a circular outer edge of the disk.

10. The hard disk drive of claim 8, wherein the air foil has a trailing portion located opposite the leading edge, and wherein the trailing portion tapers down in axial thickness in an air flow direction away from the disk to define a gradually expanding passage, such that as the air flow transitions from the disk to the trailing portion, the taper gradually decreases a speed of the air flow.

11. The hard disk drive of claim 10, wherein the trailing portion of the air foil has a linear trailing edge that is substantially perpendicular to a direction of the air flow at the downstream side of the disk.

12. The hard disk drive of claim 1, further comprising a contraction located in the bypass channel adjacent to an upstream side of the disk and offset from the disk in the radial direction, such that the contraction re-accelerates a slow bypass air flow from the contraction to the disk to provide efficient energy conversion for the air flow from pressure energy to kinetic energy prior to merging the slow bypass air flow with air flow around the disk.

13. The hard disk drive of claim 1, wherein the bypass channel is a full bypass that extends from the downstream side of the disk to an upstream side of the disk.

14. A hard disk drive, comprising:
a housing;
a disk pack mounted to the housing and having a plurality of disks that are rotatable relative to the housing, the disk pack defining an axis of rotation and a radial direction relative to the axis, and the disk pack having a downstream side wherein air flows away from the disks, and an upstream side wherein air flows toward the disks;
an actuator mounted to the housing and being movable relative to the disk pack, the actuator having a plurality of heads for reading data from and writing data to the disks;
a bypass channel formed in the housing for directing the air flow generated by rotation of the disks from the downstream side of the disk pack to the upstream side of the disk pack;
a diffuser located in the bypass channel adjacent to the downstream side of the disk pack and offset downstream from the disks in the radial direction, such that the diffuser reduces air flow drag from the disks due to disk wake in the bypass channel; and
a contraction located in the bypass channel adjacent to the upstream side of the disk pack and offset upstream from the disks in the radial direction, such that the contraction re-accelerates a slow bypass air flow from the contraction to the disks to provide efficient energy conversion for the air flow from pressure energy to kinetic energy prior to merging the slow bypass air flow with air flow around the disks.

15. The hard disk drive of claim 14, wherein each of the diffuser and the contraction further comprise an air filter for filtering the air flowing through the bypass channel.

16. The hard disk drive of claim 14, wherein the diffuser and the contraction incorporate electrical charges to filter the air flowing through the bypass channel.

17. The hard disk drive of claim 14, wherein each of the diffuser and the contraction are spaced apart from outer edges of the disks in radial directions by approximately 0.5 mm.

18. The hard disk drive of claim 14, wherein the bypass channel is located between an outer perimeter of the housing and the actuator, such that the bypass channel completely circumscribes the actuator.

19. The hard disk drive of claim 14, wherein both the diffuser and the contraction have a plurality of airfoils that are axially apart from each other, respectively, in the axial direction, each of the airfoils having a generally planar orientation in the radial direction and being axially aligned with one of the disks, the airfoils also having a maximum axial thickness that is less than or equal to an axial thickness of said one of the disks.

20. The hard disk drive of claim 19, wherein each of the airfoils of the diffuser has a leading edge with a flat transverse surface extending in the axial direction that is located immediately adjacent to said one of the disks and is substantially perpendicular to a planar orientation of said one of the disks, and wherein each of the airfoils of the contraction has a trailing edge located immediately adjacent to said one of the disks, and a leading edge with a rounded surface that is located opposite the trailing edge.

21. The hard disk drive of claim 20, wherein the leading edges of the airfoils of the diffuser and the trailing edges of the airfoils of the contraction have arcuate contours that are complementary in shape with respect to circular outer edges of the disks.

22. The hard disk drive of claim 20, wherein the airfoils of the diffuser have trailing portions located opposite the leading edges, and wherein the trailing portions taper down in axial thickness in an air flow direction away from the disks to define gradually expanding passages, such that as the air flow transitions from the disks to the trailing portions, the tapers gradually decrease a speed of the air flow.

23. The hard disk drive of claim 22, wherein the tapers on the airfoils of the diffuser are smooth and edge-free from the leading edges to the trailing portions, and wherein the airfoils of the contraction have similar smooth and edge-free tapers extending from their respective leading edges to their respective trailing edges.

24. The hard disk drive of claim 22, wherein the trailing portions of the airfoils of the diffuser and the leading edges of the airfoils of the contraction have linear edges that are substantially perpendicular to the directions of the air flow at the downstream and upstream sides, respectively, of the disk pack, and wherein the leading edges of the airfoils of the contraction are rounded.

* * * * *